(12) United States Patent
Eiba et al.

(10) Patent No.: US 10,183,595 B2
(45) Date of Patent: Jan. 22, 2019

(54) DEVICE FOR MECHANICAL VEHICLE-SEAT ADJUSTMENT

(71) Applicant: Bayerische Motoren Werke Aktiengesellschaft, Munich (DE)

(72) Inventors: Gerd Eiba, Ottobrunn (DE); Stefan Schwingenschloegel, Karlsfeld (DE); Katharina Troegler, Haag an der Amper (DE); Alfred Papst, Munich (DE); Rene Mayer, Munich (DE); Daniel Berkemeyer, Munich (DE); Osman Guerbuez, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/389,470

(22) Filed: Dec. 23, 2016

(65) Prior Publication Data

US 2017/0101034 A1 Apr. 13, 2017

Related U.S. Application Data

(63) Continuation of application No. PCT/EP2015/063533, filed on Jun. 17, 2015.

(30) Foreign Application Priority Data

Jun. 26, 2014 (DE) .................. 10 2014 212 328

(51) Int. Cl.
*B60N 2/235* (2006.01)
*B60N 2/90* (2018.01)

(52) U.S. Cl.
CPC ............. *B60N 2/2356* (2013.01); *B60N 2/90* (2018.02)

(58) Field of Classification Search
CPC .......... B60N 2/2356; B60N 2/44; B60N 2/22; B60N 2/02

(Continued)

(56) References Cited

U.S. PATENT DOCUMENTS

| 2004/0173653 | A1 | 9/2004 | Audet |
| 2006/0250013 | A1 | 11/2006 | Shao |
| 2014/0238188 | A1* | 8/2014 | Ito ........................ B60N 2/0228 74/664 |

FOREIGN PATENT DOCUMENTS

| DE | 10 2005 059 473 A1 | 6/2007 |
| DE | 20 2008 000 996 U1 | 3/2008 |

(Continued)

OTHER PUBLICATIONS

International Search Report (PCT/ISA/210) issued in PCT Application No. PCT/EP2015/063533 dated Sep. 4, 2015 with English translation (eight pages).

(Continued)

*Primary Examiner* — Mark R Wendell
(74) *Attorney, Agent, or Firm* — Crowell & Moring LLP

(57) ABSTRACT

A device is provided for mechanical vehicle-seat adjustment, in particular for a motor vehicle or utility vehicle, wherein the device has an actuating handle, which can be moved between an idle position and an actuation position in such a way that a seat part of a vehicle seat is locked in the position of the seat part in the idle position of the actuating handle and can be adjusted in the position of the seat part in the actuation position of the actuating handle. The device is designed in such a way that the actuating handle is guided movably between the idle position and the actuation position exclusively translationally in order to adjust the seat part.

16 Claims, 3 Drawing Sheets

(58) Field of Classification Search
USPC .................................. 297/354.1, 354.12, 358
See application file for complete search history.

(56) References Cited

FOREIGN PATENT DOCUMENTS

| DE | 10 2009 035 229 A1 | 2/2011 |
|----|---------------------|--------|
| EP | 1 000 571 A1        | 5/2000 |

OTHER PUBLICATIONS

German-language Written Opinion (PCT/ISA/237) issued in PCT Application No. PCT/EP2015/063533 dated Sep. 4, 2015 (five pages).
German Office Action issued in counterpart German Application No. 10 2014 212 328.3 dated Feb. 18, 2015 (five pages).

* cited by examiner

DEVICE FOR MECHANICAL VEHICLE-SEAT ADJUSTMENT

CROSS REFERENCE TO RELATED APPLICATIONS

This application is a continuation of PCT International Application No. PCT/EP2015/063533, filed Jun. 17, 2015, which claims priority under 35 U.S.C. § 119 from German Patent Application No. 10 2014 212 328.3, filed Jun. 26, 2014, the entire disclosures of which are herein expressly incorporated by reference.

BACKGROUND AND SUMMARY OF THE INVENTION

The invention relates to a device for mechanical vehicle seat adjustment, in particular for a motor vehicle or utility vehicle. The device has an actuating handle, which can be adjusted between an idle position and an actuation position such that a seat part of a vehicle seat is locked in its position in the idle position of the actuating handle, and in the actuation position of the actuating handle, can be adjusted in its position.

Furthermore, the invention relates to a vehicle seat having such a device as well as to a vehicle having such a vehicle seat.

Such a conventional device for mechanical vehicle seat adjustment is largely known from the state of the art. Such a device may, for example, be provided for adjusting an inclination of a backrest of a vehicle seat constructed as a seat part when the actuation handle is in its actuation position. In the case of this conventional device, this usually takes place by means of a manual rotating motion of the actuation handle from its idle position into its actuation position, in order to be able to release a locking of the backrest and finally adjust the inclination of the backrest. As soon as this setting or adjusting operation of the backrest inclination has been concluded, the actuation handle is usually simply let go or released, so that, by way of a restoring mechanism, the latter can independently, i.e. without any outside influence, rotate back to its idle position for another locking of the backrest.

Since such a rotatable or swivelable actuation handle is usually arranged laterally at the vehicle seat, a user sitting in the vehicle seat, as intended, has to grip the actuating handle laterally at the vehicle seat. In such a case, when changing the gripped actuating handle from its idle position to its actuation position, among other things, the user's wrist is twisted during the actuation process together with the actuating handle. From an ergonomic point of view, the twisting of the wrist when operating the actuating handle is extremely uncomfortable for the user.

It is therefore an object of the invention to further develop the devices known from the state of the art for mechanical vehicle seat adjustment such that handling of the actuating handle will be ergonomically improved.

This and other objects are achieved according to the invention by a device for mechanical vehicle seat adjustment, particularly for a motor vehicle or utility vehicle, having an actuating handle, which can be adjusted between an idle position and an actuation position such that a seat part of a vehicle seat is locked in its position in the idle position of the actuating handle, and in the actuation position of the actuating handle, can be adjusted in its position. The device is equipped such that the actuating handle for adjusting the seat part is be exclusively translationally movably guided between the idle position and the actuation position.

As a result, the handling of the actuating handle is considerably improved ergonomically because the user only has to carry out a linear pulling motion for actuating the actuating handle, and twisting of the user's wrist is considerably reduced because of the linear pulling motion. The exclusively translational motion of the actuating handle further has the advantage that an interaction of the actuating handle with objects situated in the vehicle, for example, a vehicle seat belt, the user's jacket, etc., can at least be reduced, as the actuating handle is moved back into its idle position only translationally and not—corresponding to the state of the art—rotationally. The reason is that a projected surface swept over or passed over by the actuating handle from its actuation position in its idling position, or a corresponding three-dimensional envelope in the case of a pure translation of the actuating handle, is less than in the case of a rotating or pivoting motion of the actuating handle.

Advantageously, the device according to the invention can be further developed such that the actuating handle is designed in such a fashion that, in the frontal view, the actuating handle has an essentially rectangular shape and/or the actuating handle is translationally movably guided in its longitudinal direction.

Furthermore, the device according to the invention can be implemented such that the actuating handle has a handle section and a guidance section adjoining the handle section, the handle section having a shape that is curved at least in parts, preferably with a closed cross-section, and/or the guidance section is coupled with a linear guide, so that the actuating handle is exclusively translationally movably guided between the idle position and the actuation position within the linear guide.

Furthermore, the device according to the invention can be implemented such that the handle section has an eyelet shape, at least in parts, and/or the guiding section is coupled with a conversion mechanism which is equipped for converting a translational motion of the actuating handle to a rotational motion for actuating a locking mechanism, particularly for rotating a locking element of the locking mechanism.

Because of the eyelet shape of the handle section, the actuating handle as such can be easily recognized by the user, so that the user is intuitively caused to operate and test the actuating handle.

Because of the suitable further development of the conversion mechanism as well as of the locking mechanism, specifically as a result of the purely translational guidance of the actuating handle, a width reduction of the conversion mechanism can be achieved with respect to the y-direction of the conventional vehicle coordinate system. It is also advantageous because of the flexible further development capability of the conversion mechanism that the actuating handle can be arranged at a point with respect to the vehicle seat for the translational guidance at which the handle section protrudes in a free-standing manner laterally at the vehicle seat, for example, in an area between a lower seat part forming the seat surface and the backrest.

Furthermore, the device according to the invention can be implemented such that the conversion mechanism is formed by a conversion lever, which is connected with the locking element such that, before the establishment of a force fit with the locking element, the conversion lever can be rotated relative to the locking element, preferably within a play predefined by a form fitting with the locking element, and after the generating of the force fit will be rigidly coupled with the locking element.

The conversion mechanism preferably uses a deflection lever or conversion lever for converting the translational motion of the actuating handle to the rotational motion. The conversion lever may, for example, be connected at one end by way of a guiding or compensating device (for example, with a translational degree of freedom in a direction perpendicular to the moving direction of the actuating handle), with the actuating handle, so that one end of the conversion lever can follow the translational motion of the actuating handle. In contrast, the other end of the conversion lever is disposed in a rotatable manner and is connected with the locking element for rotating the locking element. The other end of the conversion lever is preferably connected with a locking element designed as an adapter piece such that, before the establishment of a force fit, the other end and the adapter piece can first be rotated relative to one another and be correspondingly aligned, and after the establishment of the force fit, are rigidly connected with one another, so that a rotation of the other end results directly in the rotation of the adapter piece. For example, before the establishment of the force fit, the other end and the adapter piece can be connected with one another while being rotatable relative to one another, in that one or more screws are inserted in one or more oblong holes provided in the adapter piece and corresponding precisely fitting holes provided in the other end, so that the relative rotation between the other end and the adapter piece is limited by a form fit between the respective screws and oblong holes. After a corresponding alignment of the conversion lever, the force fit can finally be established by tightening the screws. This results in an advantageous adjusting possibility of the conversion lever for compensating tolerances, which are caused, for example, by the locking mechanism.

The device according to the invention can further be implemented such that the locking mechanism is designed to release a locking of the seat part for the adjustment of its position when the actuating handle is in its actuation position, and for carrying out a locking of the seat part when the actuating handle is in its idle position.

In addition, the device according to the invention can be further developed such that a restoring device, particularly in the form of a restoring spring, is provided, which is designed for forcing the actuating handle from its actuation position into its idle position. The actuating handle can, for example, be moved against a restoring force of the restoring device, particularly the restoring spring, into the actuation position and, by way of this restoring force, is forced back into the idle position and, in particular, is also moved back when the actuating handle is released, i.e. no manual outside influence acts upon the actuating handle.

Furthermore, the device according to the invention is implemented such that the seat part is a backrest, whose inclination can be adjusted, when the actuating handle is in its actuation position. In contrast, the inclination of the backrest cannot be adjusted in the idle position of the actuating handle; i.e. the backrest is locked. As an alternative, it may also be provided that the seat part is a lower seat part forming a seat surface, the height or inclination of the seat part being adjustable by actuating the actuating handle.

The vehicle seat according to the invention includes the device according to the invention.

The vehicle according to the invention has the vehicle seat according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
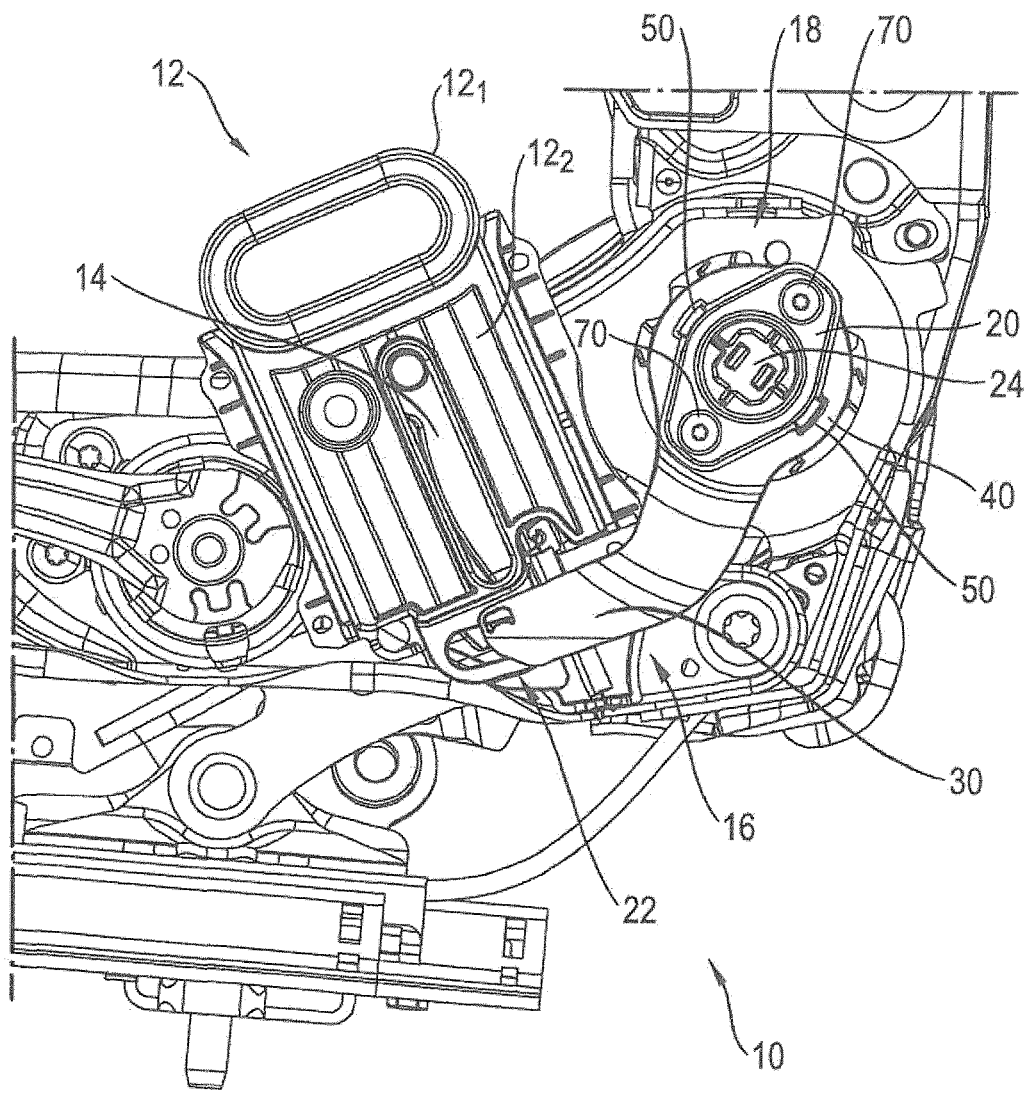
FIG. 1 is a schematic view of an exemplary device according to the invention.

FIG. 1 schematically illustrates an exemplary device 10 according to the invention. In this embodiment, the device 10 of FIG. 1 is a component of a vehicle seat 100 of a motor vehicle or utility vehicle. The representation illustrated in FIG. 1, in particular, is a view in the transverse direction of the vehicle (y-direction of the conventional vehicle coordinate system), which shows a lateral area of the vehicle seat 100, which is situated at least in sections behind a lateral frame of the vehicle seat 100 and would therefore only be partially visible.

The device 10 is provided for the mechanical vehicle seat adjustment and, for this purpose, includes an actuating handle 12.

Figure 2:
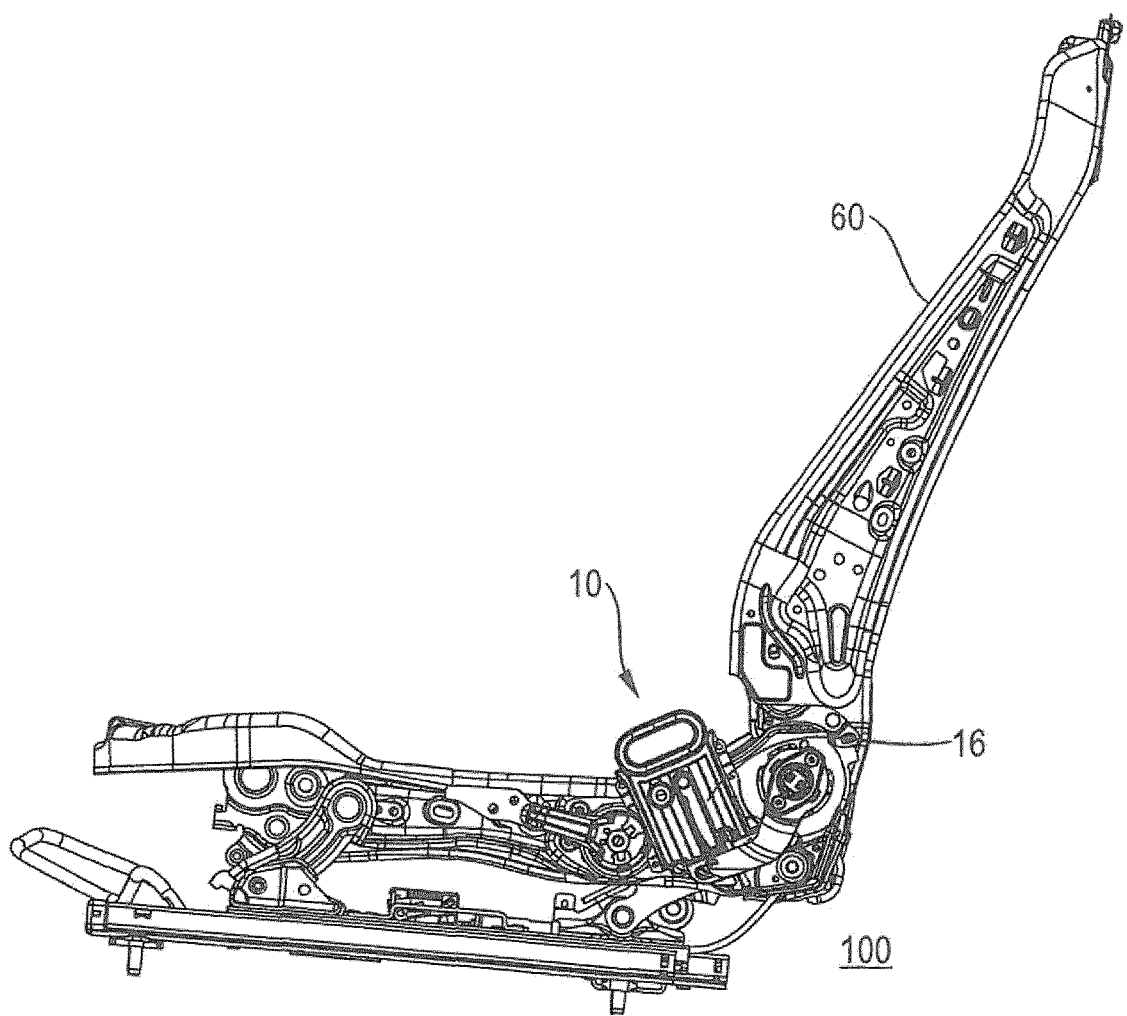
FIG. 2 is a schematic view of the device of FIG. 1 wherein the actuating handle is in the idle position.

The actuating handle 12 can be adjusted or moved between an idle position and an actuation position such that a seat part 60 of the vehicle seat 100 constructed as a backrest is locked in its position in the idle position of the actuating handle 12 and, in the actuation position of the actuating handle 12, can be adjusted in its position. FIG. 2 is a schematic representation of the device 10 when the actuating handle 12 is in the idle position, and FIG. 3 is a schematic representation of the device 10 when then actuating handle 12 is in the actuation position.

Figure 3:
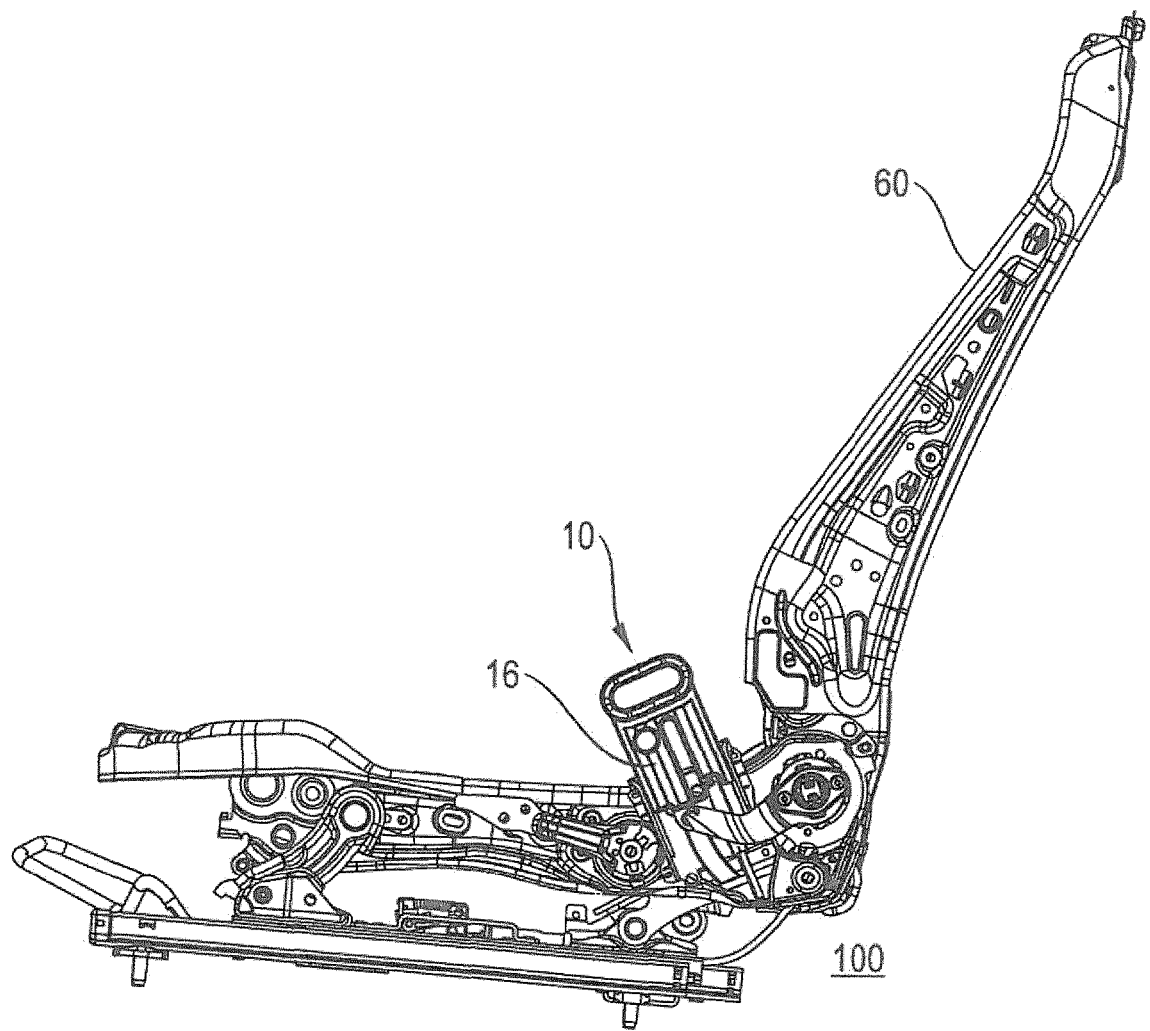
FIG. 3 is a schematic view of the device of FIG. 1 wherein the actuating handle is in the actuation position.

As illustrated in FIGS. 1 to 3, particularly the inclination of the seat part 60 constructed as a backrest can be adjusted when the actuating handle 12 is in its actuation position. In contrast, the inclination of the seat part 60 constructed as a backrest will not be adjustable when the actuating handle 12 is in its idle position; i.e. the seat part constructed as a backrest is locked.

The device 10 is designed such that the actuating handle 12 for adjusting the seat part 60 is exclusively translationally movably guided between the idle position and the actuation position. In this case, the translational guiding of the actuating handle 12 is carried out by a linear guide 14 illustrated only partially in FIG. 1. Furthermore, a restoring device (not shown in FIG. 1), for example, in the form of restoring spring is provided, which is designed for forcing the actuating handle 12 from its actuation position into its idle position. A permanent restoring force, for example, acts upon the actuating handle 12 and forces the actuating handle 12 permanently in the direction of its idle position.

In this embodiment, the actuating handle 12 is designed such that, in a frontal view, i.e. in a view in the transverse direction of the vehicle (y-direction of the vehicle) as illustrated in FIG. 1, the actuating handle 12 has an essentially rectangular shape so that, if possible, the contour of the actuating handle 12 has no interaction points, at which, for example, objects could get caught which are situated in the vehicle. The reason is that the actuating handle 12 is translationally movably guided in its longitudinal direction with respect to its rectangular cross-section, so that an envelope in the case of the purely translationally guided actuating handle 12 is smaller than one in the case of a rotationally guided actuating handle.

As also illustrated in FIG. 1, the actuating handle 12 has a handle section $12_1$, and a guiding section $12_2$ adjoining the handle section $12_1$. The handle section $12_1$ has a shape that is curved, at least in parts, in this case having a roundish eyelet shape, wherein the eyelet shape has a closed cross-section with or without a through-hole.

The guiding section $12_2$ is coupled with the linear guide 14, so that the actuating handle 12 can be movably guided exclusively translationally between the idle position and the actuation position within the linear guide 14. Furthermore, the guiding section $12_2$ is coupled with a conversion mechanism 16, for example in the form of a conversion or deflection lever, which is designed for converting the translational motion of the actuating handle 12 into a rotational motion for actuating a locking mechanism 18, particularly for rotating a locking element 20 of the locking mechanism 18. The locking mechanism 18 is constructed as an adapter piece, as schematically illustrated in FIG. 1. In this case, the locking mechanism 20 is designed for releasing a locking of the seat part 60 constructed as a backrest for adjusting its position or inclination, when the actuating handle 12 is situated in its actuation position, and for carrying out a locking of the seat part 60 constructed as a backrest when the actuating handle 12 is in its idle position.

In particular, the conversion lever is connected at one (first) end 30 with the actuating handle 12 by way of a guiding or compensating device 22 with a translational degree of freedom in a direction perpendicular to the moving direction of the actuating handle 12, so that the one first end 30 of the conversion lever can follow the translational motion of the actuating handle 12 and, in this case, can move relative to the actuating handle 12 perpendicularly to the moving direction of the actuating handle 12.

The other (second) end 40 of the conversion lever is rotatably disposed at the locking mechanism 18 and, for rotating the locking element 20 constructed as an adapter piece, is connected with the locking element 20. In this embodiment, the locking element 20 is non-rotatably fitted onto a shaft 24 of the locking mechanism 18, so that the locking element 20 takes up a position caused by tolerances of the locking mechanism 18 and predefined by the shaft 24. Correspondingly, the other, second end 40 of the conversion lever is designed such that it can be connected with the locking element 20 constructed as an adapter piece so that the other, second end 40 and the adapter piece, before the establishment of a force fit, can first be rotated relative to one another about an axis, for example, with respect to the shaft 24, and can be correspondingly aligned, and, after the establishment of the force fit, are rigidly connected with one another, so that a rotation of the other, second end 40 of the conversion lever results directly in the rotation of the adapter piece.

In this case, the other, second end 40 of the conversion lever and the adapter piece are designed such that the other, second end 40 and the adapter piece, before the establishment of the force fit, are rotatably connected relative to one another with one another, in that, in this case, two screws 70 are inserted in two oblong holes provided in the adapter piece and two corresponding, precisely fitting holes provided in the other second end 40 of the conversion lever, so that the relative rotation between the other, second end 40 of the conversion lever and the adapter piece will be limited by a form fit between the respective screws 70 and the oblong holes. After a corresponding alignment of the conversion lever 16, the force fit can finally be established by tightening the screws 70 in such a manner that the other, second end 40 and the adapter piece are rigidly connected with one another.

As further illustrated in FIG. 1, for example, two detents 50 may be provided on the conversion lever, in order to permit a prepositioning or premounting of the locking element 20 constructed as an adapter piece, for example, by means of engaging the adapter piece between the two detents 50.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for mechanical vehicle seat adjustment of a seat part of a seat, comprising:
   an actuating handle adjustable between an idle position and an actuation position, wherein the seat part of the seat is locked in position in the idle position of the actuating handle and is positionally adjustable in the actuation position of the actuating handle, wherein
   the actuating handle is disposed on a lateral side of a lower seat part forming a seat surface and configured to be exclusively translationally movably guided between the idle position and the actuation position for the mechanical vehicle seat adjustment of the seat part.

2. The device according to claim 1, wherein the device is configured for a vehicle seat of a motor or utility vehicle.

3. The device according to claim 2, wherein
   the actuating handle is configured to have a substantially rectangular shape in a frontal view taken along a y-axis of the vehicle, and
   the actuating handle is exclusively translationally movably guided in a longitudinal extent of the substantially rectangular shape.

4. The device according to claim 2, wherein
   the actuating handle is translationally movably guided in a longitudinal extent of the actuating handle.

5. The device according to claim 1, wherein
   the actuating handle has a handle section and a guidance section adjoining the handle section, and
   the handle section has a shape that is curved at least partially.

6. The device according to claim 5, wherein the handle section has a shape that is curved at least partially and forms a closed cross-section.

7. The device according to claim 5, wherein
   the guidance section is coupled with a linear guide so that the actuating handle is exclusively translationally movably guided between the idle position and the actuation position within the linear guide.

8. The device according to claim 5, further comprising:
   a conversion lever equipped to convert the exclusive translational movement of the actuating handle to a rotational movement for actuating a locker, wherein
   the guidance section of the actuating handle is coupled with the conversion lever.

9. The device according to claim 8, wherein
the conversion lever is connected with a locking element of the locker such that, before establishing a force-fit with the locking element, the conversion lever is rotatable relative to the locking element and, after establishing the force-fit, is rigidly coupled with the locking element.

10. The device according to claim 9, wherein
the locker is configured to release a locking of the seat part for adjusting the position of the seat part when the actuating handle is in the actuation position, and is configured to carry out a locking of the seat part when the actuating handle is in the idle position.

11. The device according to claim 1, further comprising a restoring spring configured to bias the actuating handle from the actuation position into the idle position.

12. The device according to claim 1, wherein the seat part is a backrest, and an inclination of the back rest is adjustable when the actuating handle is in the actuation position.

13. A vehicle seat comprising a device for mechanical vehicle seat adjustment according to claim 1.

14. A vehicle, comprising:
a vehicle seat; and
a device for mechanical vehicle seat adjustment of a seat part of the vehicle seat according to claim 1.

15. The device according to claim 1, wherein the actuating handle is configured to be manually operable by an occupant seated on the seat.

16. A device for mechanical vehicle seat adjustment of a seat part of a seat, comprising:
an actuating handle adjustable between an idle position and an actuation position, wherein the seat part of the seat is locked in position in the idle position of the actuating handle and is positionally adjustable in the actuation position of the actuating handle, wherein
the actuating handle is disposed laterally on a frontal side of a lower half of a backrest of the seat and configured to be exclusively translationally movably guided between the idle position and the actuation position for the mechanical vehicle seat adjustment of the seat part.

* * * * *